United States Patent
Squyres et al.

(10) Patent No.: US 7,731,462 B2
(45) Date of Patent: Jun. 8, 2010

(54) BULKHEAD FOR DIVIDING A CARGO CONTAINER INTO TWO COMPARTMENTS

(75) Inventors: Jerrell P. Squyres, Dallas, TX (US); Kelly Lee Miller, Grand Saline, TX (US)

(73) Assignee: JPS Corporation, Dallas, TX (US)

( * ) Notice: Subject to any disclaimer, the term of this patent is extended or adjusted under 35 U.S.C. 154(b) by 0 days.

(21) Appl. No.: 11/776,894

(22) Filed: Jul. 12, 2007

(65) Prior Publication Data

US 2009/0016840 A1    Jan. 15, 2009

(51) Int. Cl.
*B60P 7/08* (2006.01)

(52) U.S. Cl. .................. 410/130; 410/129; 410/132; 410/142

(58) Field of Classification Search ................. 410/118, 410/119, 129, 130, 131, 132–135, 137, 138, 410/140, 141–143, 145, 150, 151; 296/24.4, 296/37.6; 224/42.33, 42.34; 220/534, 541, 220/542, 545, 546
See application file for complete search history.

(56) References Cited

U.S. PATENT DOCUMENTS

| | | | | |
|---|---|---|---|---|
| 4,986,706 A | * | 1/1991 | Williams, Jr. | ............... 410/129 |
| 6,981,828 B2 | | 1/2006 | Davies et al. | |
| 7,357,610 B2 | * | 4/2008 | Squyres | ..................... 410/104 |

* cited by examiner

*Primary Examiner*—Stephen Gordon
(74) *Attorney, Agent, or Firm*—Carstens & Cahoon, LLP; Vincent J. Allen

(57) ABSTRACT

A bulkhead for dividing a cargo container into separate compartments. The bulkhead has a first side facing a first compartment and a second side facing the second compartment. One or more bars are attached to the first side of the bulkhead. In one aspect, mounting brackets having a vertically aligned elliptical opening permits the fastening bar to have some play to better operate during instances of rough transportation.

17 Claims, 4 Drawing Sheets

BULKHEAD FOR DIVIDING A CARGO CONTAINER INTO TWO COMPARTMENTS

BACKGROUND OF THE INVENTION

1. Technical Field

The present invention relates to a bulkhead for dividing a cargo container into a first compartment and a second compartment.

2. Description of Related Art

Cargo containers, such as those used in railcars and trailers for tractor trailer vehicles, often have the capacity to ship a relatively large volume of goods. To efficiently use space in cargo containers, it may become necessary to load the cargo container with goods from different suppliers for delivery to multiple destinations.

For example, two families moving from New York to California may each require only a section, or portion, of the potential cargo volume available in the cargo container. Alternatively, shipping goods from different suppliers from a port to multiple distribution centers can require the goods be placed in a single cargo container for a cost effective means of transportation. However, it may be highly desirable to provide a way to prevent the different goods from co-mingling.

One prior art solution to this problem is illustrated by FIG. 1. FIG. 1 is a perspective view of a container and divider disclosed in U.S. Pat. No. 6,981,828. As shown, the container 10 has a secured divider 12 separating the container 10 into a first secured compartment 14 and a second non-secured compartment 16. The divider 12 must be placed into a base 30 before the entire divider 12 is secured into place. The '828 patent discloses placing a first bar 32 on one side of the divider 12 and a second bar 40 on the opposite side of the divider 12. Such divider 12 is difficult to maneuver into place and lock. Consequently, a need exists for a bulkhead for dividing a cargo container into two compartments that is secure and is relatively easy to place into service.

SUMMARY OF THE INVENTION

The present invention is directed towards a bulkhead for dividing a container into multiple compartments. In one aspect, the bulkhead comprises a first side facing the first compartment and a second side facing a second compartment and the bulkhead is configured to extend between opposing walls and between the roof and floor of the cargo container. In one aspect, the bulkhead is secured into position by a bar attached to the first side of the bulkhead that mounts to trucks or opposing walls.

The above, as well as additional features and advantages of the invention will become apparent in the following written, detailed description.

BRIEF DESCRIPTION OF THE DRAWINGS

The novel features believe characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

DETAILED DESCRIPTION

Figure 1:
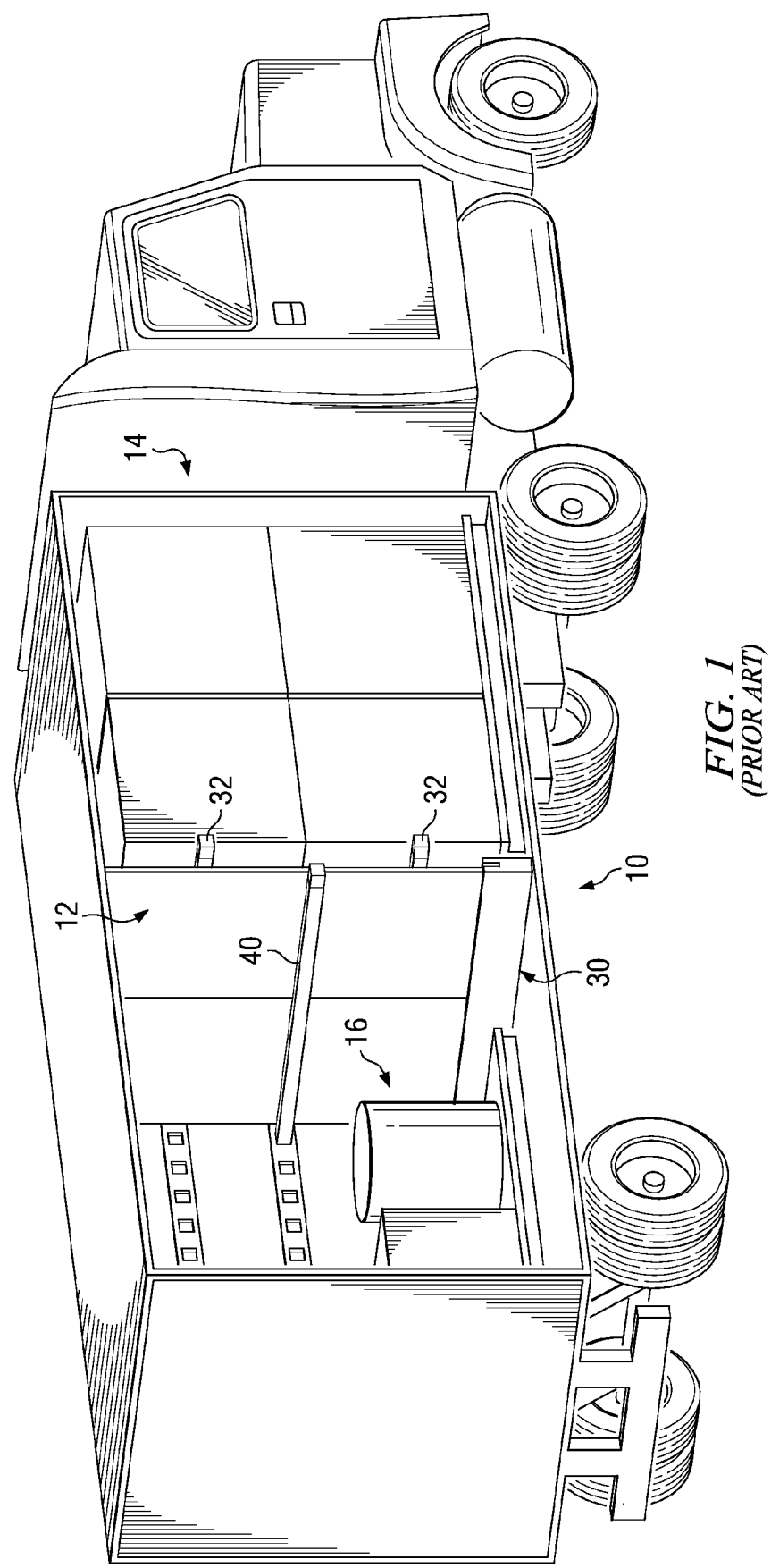
FIG. 1 is a perspective view of a prior art container.
Figure 2:
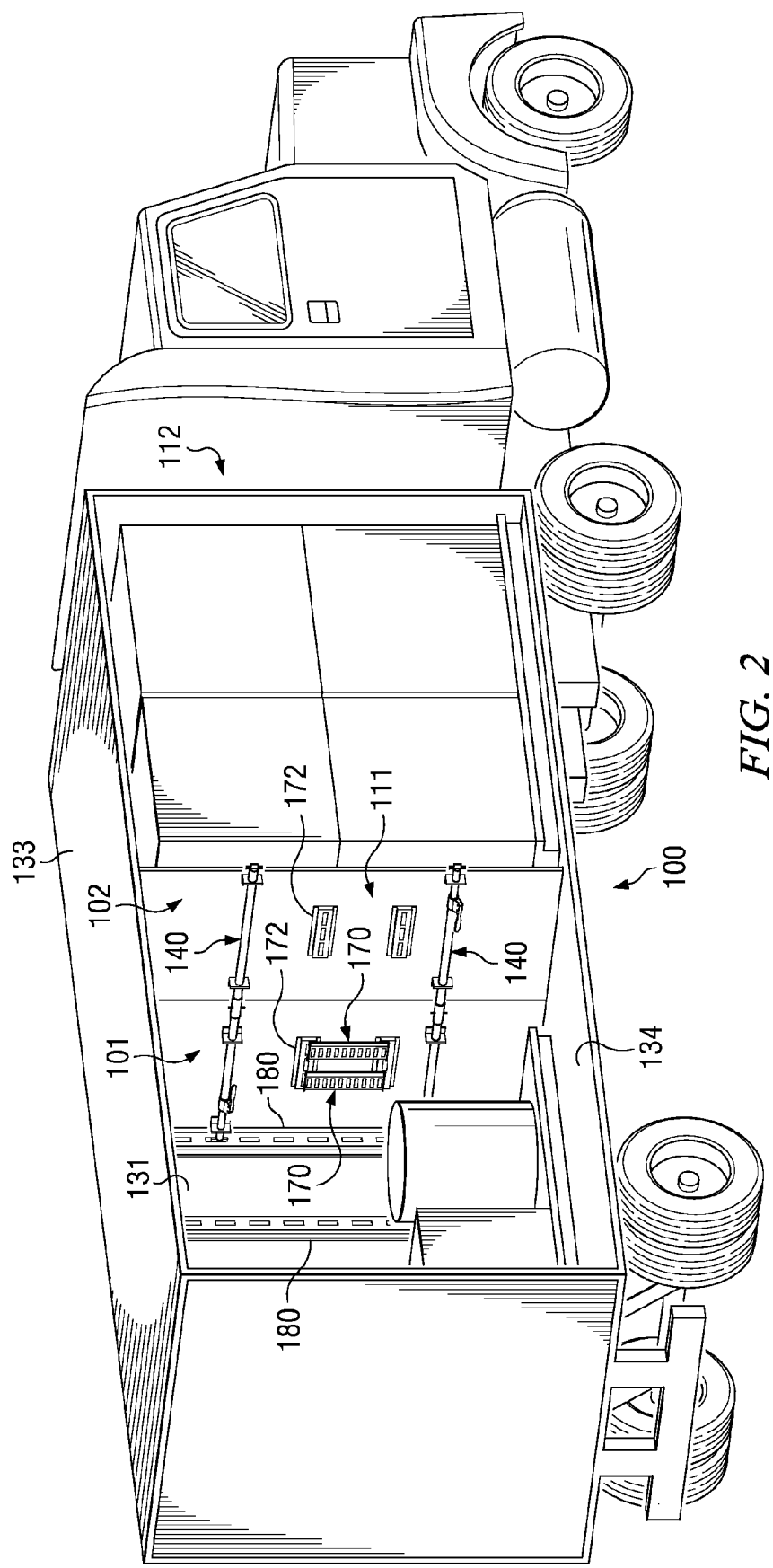
FIG. 2 is a perspective view of a bulkhead for dividing a cargo contained into a first compartment and a second compartment in accordance with one embodiment of the present invention.
Figure 3:
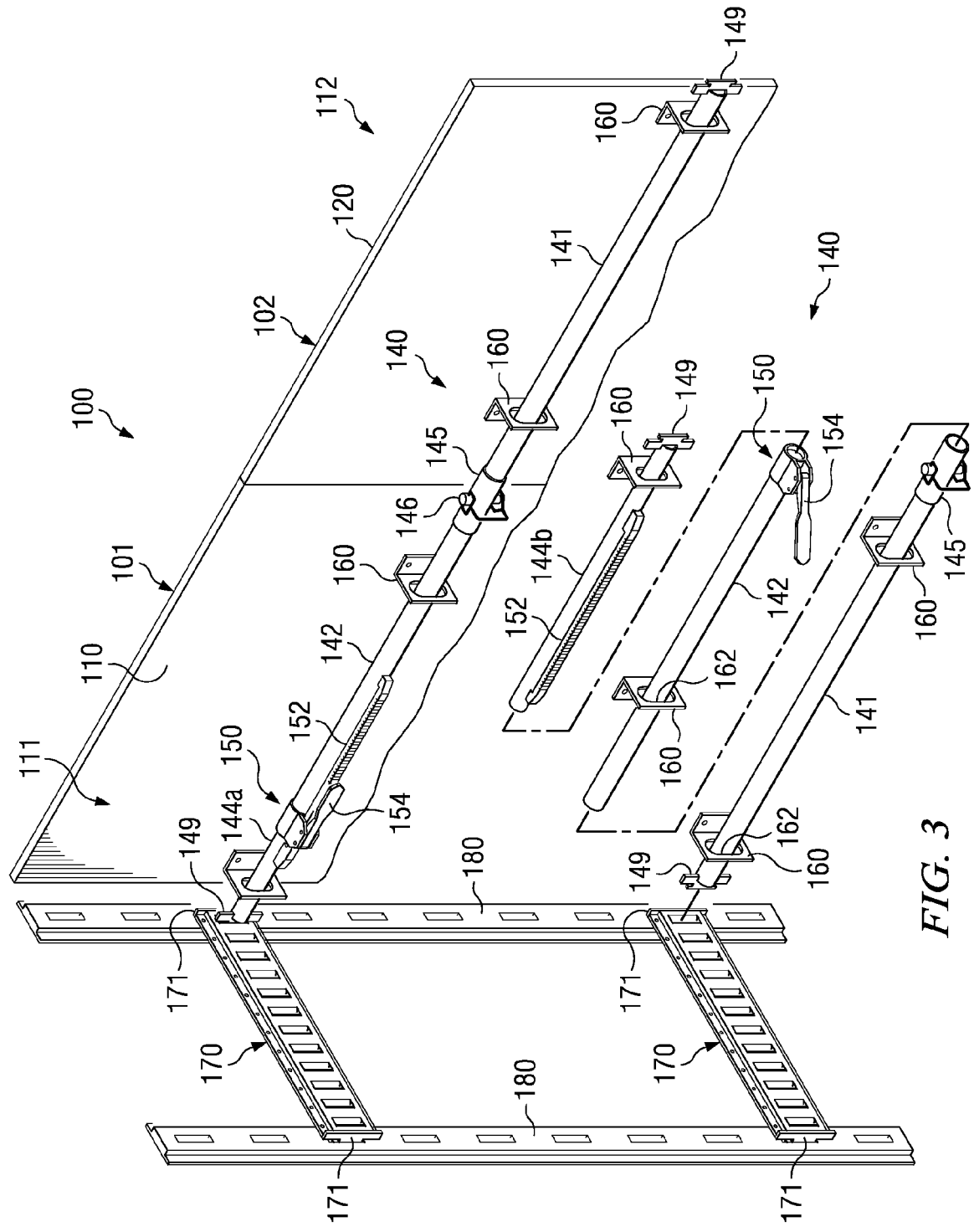
FIG. 3 is a partially exploded perspective view of a bulkhead assembly in accordance with one embodiment of the present invention.

FIG. 2 is a perspective view of a bulkhead for dividing a cargo container into a first compartment and a second compartment in accordance with one embodiment of the present invention. FIG. 3 is a partially exploded perspective view of a bulkhead assembly in accordance with one embodiment of the present invention. Referring to FIGS. 2 and 3, the bulkhead 100 comprises a first side 110 facing a first compartment 111 and a second side 120 facing the second compartment 112. The bulkhead is configured to extend substantially from the first wall 131 to the second wall 132 (shown in FIG. 4) and to the container top 133 and the container bottom 134. The bulkhead can comprise one or more sections and, as shown, comprises a first section 101 and a second section 102. In one embodiment, the bulkhead comprises ⅝-inch plywood. Also shown are two bars 140 extending from the first wall 131 to the second wall 132 (shown in FIG. 4). Although two bars 140 are shown, the invention can comprise one or more bars mounted in such a manner. Notably, the bars 140 are mounted only to the first side 110 of the bulkhead. In one embodiment, the second side comprises no brackets, locks or bars.

In one embodiment, the bulkhead comprises a first section 101 and a second section 102 which are substantially equal in size. It should, however, be pointed out that one or more sections having varying sizes can be used in accordance with various embodiments of the present invention. Referring to FIG. 3, in one embodiment, the bar 140 further comprises a first bar 141 and a second bar 142, the first bar 141 and second bar 142 being attached by a collar 145. The collar 145 can be integral with either the first bar 141 or the second bar 142. If the collar 145 is integral with the first bar 141, then the second bar 142 is slidably disposed into the collar 145. Similarly, if the second bar 142 comprises an integral collar 145, the first bar 141 can be slidably disposed into the collar 145. In one embodiment, the first bar 141 second bar 142 and adjustable bar 144 comprise a cast aluminum housing. Of course, other suitable materials can be used.

In one embodiment, as best depicted by the exploded bar 140 shown in FIG. 3, an adjustable rack gear 152 has a left end and a right end. The right end can be attached to the adjustable bar 144 the left end can be disposed against the second bar 142. The adjustable bar 144 can be slidably disposed in the second bar 142 and the paddle handle 154 can be closed to lock the adjustable bar 144 into position, as shown in FIG. 2. The first bar 141, second bar 142 and/or the adjustable bar 144 can be attached to the bulkhead 100 by angle brackets 160 as needed. In one embodiment, the angle brackets comprise 3⁄16-inch thick mild steel and are attached to the bulkhead by ⅜-inch carriage bolts and secured with ⅜-inch nyloc nuts. Of course, such specific embodiment is provided only for purposes of illustration and not limitation. In one embodiment, the angle brackets 160 comprise an elliptical opening 162 having a major axis which is substantially vertical. Such embodiment permits the bar 140 to have some play. Such embodiment advantageously facilitates placement of the bulkhead into position as shown in FIG. 2. Further, such embodiment advantageously minimizes stress on the bulkhead which inevitably occurs during bumpy driving conditions. For example, if the bar 140 is attached rigidly to the bulkhead 110 and the cargo container experiences bumps due to rough road conditions, the angle brackets 160 can become separated from the bulkhead 100 resulting in commingling of goods, potential damage to the shipment, and requiring time consuming repair.

In one embodiment, the bar 140 comprises jack mounts 149 disposed at each end to attach the bar 140 to slots in either a horizontal track 170, or a vertical track 180. Consequently, in one embodiment, the bulkhead comprises a bar 140 which further comprises a jack mount 149 which can be removeably attached to a track 170 180 on the first wall 131 or second wall 132 (as shown in FIG. 4).

In one embodiment, the jack bar 149 is welded to the first bar 141 and/or to the second bar 144. In one embodiment, the first bar 141 and adjustable bar 144 comprise a slot to permit the jack bar to be inserted and welded. Of course, any suitable attachment means can be used.

Figure 4:
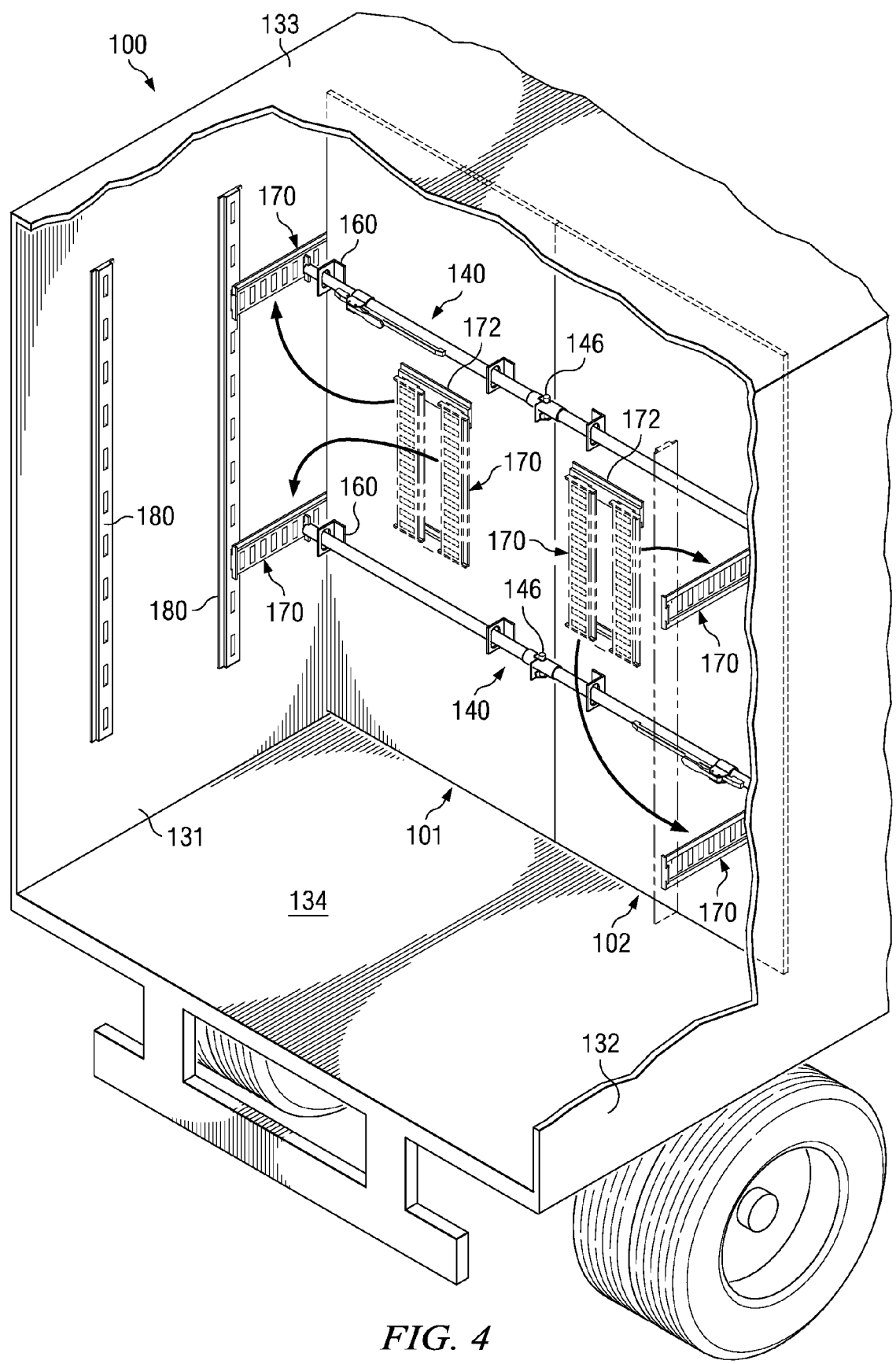
FIG. 4 is a perspective view of the bulkhead assembly in accordance with an alternative embodiment of the present invention.

The bulkhead assembly can be installed as follows:

First, in a cargo container having a first wall 131, a second wall 132 (as shown in FIG. 4), a top 133, and a bottom 134 the first bulkhead section 101 and second bulkhead section 102 can be placed adjacent one another after the front portion of the cargo container or second compartment 112 has been loaded with cargo. The bulkhead sections 101 102, in one embodiment, have angle brackets 160 pre-installed or the first side 110. In one embodiment, prior to placement of first bulkhead section 101, the second bar 142 and adjustable bar 144 are disposed through the elliptical openings 162 of the angle brackets 160. Similarly, the first bar 141 can be disposed in the elliptical openings 162 of the angle bracket 160 of the second bulkhead section 102. After the bulkhead 100 has been placed into position the first bar 141 and second bar 142 can be attached via a collar 145 and locked into place with a spring clip pin 146 or other suitable device. The jack mount 149 attached to the adjustable bar 144 can then be secured into a slot in the removeable track 170 or a vertical track 180. Other bars 140 can be latched into place by similar method.

In one embodiment, if two or more bars 140 are utilized, the adjustable ends 144 can be alternated. For example, as shown in FIG. 3, the upper adjustable bar 144 is adjacent the first wall 131 and the lower adjustable bar 144 is adjacent the second wall (not shown). Such embodiment may be advantageous for installation and security purposes and to minimize the required number of components for a complete bulkhead assembly.

FIG. 4 is a perspective view of the bulkhead assembly in accordance with an alternative embodiment of the present invention. In one embodiment, the bulkhead 100 comprises mounting brackets 172 for placing sections of removeable track 170. Vertical tracks 180 are typically installed at two foot increments inside a cargo trailer. Because space in cargo containers is sold by the foot, the removeable tracks can be placed on the vertical tracks 180 to advantageously place the bulkhead such that only the space required is purchased.

The present invention provides several advantages. One advantage is that the bulkhead can be flipped 180 degrees, thus installers will not have to worry about which side is up or which side is down. The present invention provides a bulkhead which can be used without the need of a bulky cumbersome base unit. Further, because the bars 140 are mounted only to the first side 110 of the bulkhead, it is easier to install and uninstall. The security between compartments is still maintained, as the paddle 154 can be locked with a padlock to secure the bulkhead once the bulkhead has been placed into position. Additionally, the elongated, elliptical opening 162 and the angle brackets 160 provide for play which preserves the integrity and operational lifespan of the bulkhead assembly.

While this invention has been particularly shown and described with reference to the preferred embodiment, it will be understood by those skilled in the art that various changes in form and detail may be made therein without departing from the spirit and scope of the invention.

What is claimed is:

1. A bulkhead for dividing a cargo container having a first wall, a second wall, a top, and a bottom into a first compartment and a second compartment, comprising:

a bulkhead having a first side facing the first compartment and a second side facing the second compartment, said bulkhead configured to divide said cargo container into said first compartment and said second compartment; and at least two bars movably mounted only to said first side of said bulkhead in such a manner to allow said at least two bars to move relative to said bulkhead along a longitudinal axis of said at least two bars, said at least two bars each having a first end removably attached to said first wall and a second end removably attached to said second wall, wherein each of said at least two bars comprises a first piece that is slidably attached to a second piece, said first piece having a collar for rigidly joining said first piece together with said second piece, wherein each of said at least two bars further comprises a third piece slidably disposed at one end of said bar to allow a length of said bar to be adjusted to extend from said first wall to said second wall, and wherein said at least two bars are configured to allow said bulkhead to be securely installed in said cargo container without support on said second side of said bulkhead.

2. The bulkhead of claim 1 wherein said bulkhead is symmetrical about a horizontal axis to allow for an alternative installation of said bulkhead with said first side of said bulkhead facing said second compartment.

3. The bulkhead of claim 1 wherein said second piece comprises an outer portion having a paddle handle for engaging a rack gear and wherein said rack gear is attached to said third piece wherein said third piece is slidably disposed within said outer portion of said second piece to engage said rack gear with said paddle handle thereby making said length of said bar adjustable.

4. The bulkhead of claim 1 wherein said at least two bars are mounted to said bulkhead with a plurality of brackets having openings for said at least two bars.

5. The bulkhead of claim 4 wherein each of said openings comprise an elliptical shape having a major and a minor axis wherein said major axis is substantially vertical.

6. The bulkhead of claim 1 wherein said bulkhead further comprises a first section and a second section.

7. The bulkhead of claim 6 wherein said first section and said second section are substantially equal in size.

8. The bulkhead of claim 1 further comprising a plurality of removable tracks for attaching said at least two bars to said first and second walls of said cargo container such that said bulkhead is attached to a left side of said cargo container at a first location spaced between a first set of adjacent vertical tracks mounted to said first wall and such that said bulkhead is attached to a right side of said cargo container at a second location spaced between a second set of adjacent vertical tracks mounted to said second wall of said cargo container, wherein said plurality of removable tracks are adapted for connection horizontally between said sets of adjacent vertical tracks and wherein said plurality of removable tracks are adapted for receiving said first and second ends of said at least two bars.

9. The bulkhead of claim 1 wherein said first and second ends of said at least two bars comprises a jack mount for mounting said at least two bars to said first and second walls.

10. The bulkhead of claim 1 wherein said bulkhead can be securely installed in said cargo container while accessing only said first side of said bulkhead.

11. A bulkhead for dividing a cargo container having a first wall, a second wall, a top, and a bottom into a first compartment and a second compartment, comprising:
   a bulkhead having a first side facing the first compartment and a second side facing the second compartment, said bulkhead configured to divide said cargo container into said first compartment and said second compartment; and
   at least two bars mounted only to said first side of said bulkhead and removably attached to and extending from said first wall to said second wall, wherein each bar comprises a first piece that is slidably attached to a second piece having a collar, wherein said at least two bars are configured to allow said bulkhead to be securely installed in said cargo container without support on said second side of said bulkhead, wherein said at least two bars are mounted to said bulkhead with a plurality of brackets having openings for said at least two bars, and wherein each of said openings comprises an elliptical shape having a major and a minor axis wherein said major axis is substantially vertical.

12. The bulkhead of claim 11 wherein said first piece of at least one of said at least two bars has an end adapted for removable attachment to said first wall and wherein said second piece of at least one of said at least two bars has an end adapted for removable attachment to said second wall.

13. The apparatus of claim 12 wherein said second piece is comprised of a separate left end and a separate right end wherein said respective collar is permanently attached to said separate left end and removably attached to said separate right end for rigidly joining said separate left end to said separate right end.

14. The bulkhead of claim 13 wherein said second piece comprises an outer portion having a paddle handle for engaging a rack gear attached to said first piece wherein said first piece is slidably disposed within said outer portion of said second piece to engage said rack gear with said paddle handle thereby making a length of said respective bar adjustable.

15. The bulkhead of claim 11 further comprising a plurality of removable tracks for attaching said at least two bars to said first and second walls of said cargo container such that said bulkhead is attached to a left side of said cargo container at a first location spaced between a first set of adjacent vertical tracks mounted to said first wall and such that said bulkhead is attached to a right side of said cargo container at a second location spaced between a second set of adjacent vertical tracks mounted to said second wall of said cargo container, wherein said plurality of removable tracks are adapted for connection horizontally between said sets of adjacent vertical tracks and wherein said plurality of removable tracks are adapted for receiving a first end and a second end of said at least two bars.

16. The bulkhead of claim 15 further comprising a plurality of mounting brackets for storing said plurality of said removable tracks by attaching to said bulkhead.

17. The bulkhead of claim 11 wherein said first and second ends of said at least two bars comprise a jack mount for mounting said at least two bars to said first and second walls.

* * * * *

UNITED STATES PATENT AND TRADEMARK OFFICE
CERTIFICATE OF CORRECTION

PATENT NO. : 7,731,462 B2 Page 1 of 1
APPLICATION NO. : 11/776894
DATED : June 8, 2010
INVENTOR(S) : Jerrell P. Squyres and Kelly Lee Miller It is certified that error appears in the above-identified patent and that said Letters Patent is hereby corrected as shown below:

Column 6, Line 30, (Claim 17) after "wherein" delete "said."

Signed and Sealed this

Thirty-first Day of August, 2010

David J. Kappos
*Director of the United States Patent and Trademark Office*